(12) United States Patent
Thompson

(10) Patent No.: US 6,230,692 B1
(45) Date of Patent: May 15, 2001

(54) FUEL VAPOR EMISSION CONTROL SYSTEM EMPLOYING STIRLING COOLING APPARATUS

(75) Inventor: Robert H. Thompson, Redford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/527,115

(22) Filed: Mar. 16, 2000

(51) Int. Cl.[7] .................................................... F02M 33/04
(52) U.S. Cl. ............................................. 123/516; 123/541
(58) Field of Search ................................... 123/516, 518, 123/541

(56) References Cited

U.S. PATENT DOCUMENTS

| | | |
|---|---|---|
| 3,477,238 | 11/1969 | Race . |
| 4,671,071 | 6/1987 | Sasaki . |
| 5,255,735 | 10/1993 | Raghava et al. . |
| 5,601,066 * | 2/1997 | Qutub .................................. 123/541 |
| 5,636,668 | 6/1997 | Thompson . |
| 5,957,113 | 9/1999 | Masaki et al. . |
| 5,964,204 * | 10/1999 | Freeland .............................. 123/516 |
| 6,176,259 * | 1/2001 | Harde et al. ........................ 123/541 |

* cited by examiner

Primary Examiner—Thomas N. Moulis
(74) Attorney, Agent, or Firm—Jerome R. Drouillard

(57) ABSTRACT

A fuel tank fabrication, a fuel system and a method for refueling a vehicle each employ a fuel tank having contained at least in part therein a liquid fuel and a fuel vapor. The at least one of the liquid fuel and the fuel vapor is then cooled while employing a Stirling cooing apparatus such that upon refueling the fuel tank there is attenuated an escape of the fuel vapor from the fuel tank.

11 Claims, 1 Drawing Sheet

FUEL VAPOR EMISSION CONTROL SYSTEM EMPLOYING STIRLING COOLING APPARATUS

BACKGROUND OF THE INVENTION

1. Field of the Invention

The present invention relates generally to fuel vapor emission control for internal combustion engines. More particularly, the present invention relates fuel tank fuel vapor emission control for internal combustion engines.

2. Description of the Related Art

Modern transportation vehicles which employ a liquid fuel conventionally also employ for storage of the liquid fuel a fuel tank. Similarly, since most liquid fuels are highly volatile, such a fuel tank typically contains in addition to the liquid fuel a fuel vapor. A concentration of fuel in the fuel vapor within the fuel tank is generally related to a temperature of the liquid fuel and the fuel vapor.

While a fuel vapor within a fuel tank does not typically impair operation of a transportation vehicle powered by an engine which employs a liquid fuel extracted from the fuel tank, upon refueling of the fuel tank with additional liquid fuel the fuel vapor must of necessity be displaced. For environmental protection purposes and for economic reasons, it is desirable for such displaced fuel vapor not to be released into the atmosphere.

Various apparatus, systems and methods have been disclosed within the arts of both fuel tank design and fuel system design for attenuating upon refueling of a fuel tank release of a fuel vapor into the atmosphere. Well known in this regard is the use of carbon filled canisters for cyclical absorptive capture and desorptive controlled release of fuel vapors displaced incident to refueling of a fuel tank.

Similarly, also known in the art are various apparatus, systems and methods which are predicated upon thermally induced condensation of a fuel vapor, such as a displaced fuel vapor, to provide a liquid fuel which is returned to a fuel tank. Representative disclosures directed towards such condensation of fuel vapor may be found within U.S. Pat. Nos. 4,671,071, 5,255,735 and 5,957,113.

While any of the foregoing apparatus, systems and methods provides upon refueling of a fuel tank with a liquid fuel attenuated displaced fuel vapor release into the atmosphere, such desirable result is often achieved only with complicated piping and valving schemes, or with electrical system drain upon an engine which is powered by the liquid fuel which forms the fuel vapor.

There thus exists within the art of fuel tank design and fuel system design a continuing need for comparatively simple apparatus, systems and methods for avoiding upon refueling of a fuel tank release of a displaced fuel vapor to the atmosphere. It is towards that object that the present invention is directed.

SUMMARY OF THE INVENTION

In order to realize the object towards which the present invention is directed, the present invention provides that a fuel tank within which is contained at least in part a liquid fuel and a fuel vapor is fabricated to contain in thermal communication with at least one of the liquid fuel and the fuel vapor a heat exchanger. In turn, the heat exchanger is fabricated to contain in thermal communication therewith a Stirling cooler in a fashion such that there is supplied to the heat exchanger a refrigeration output of the Stirling cooler in order to cool the at least one of the liquid fuel and the fuel vapor.

In the preferred embodiments of a fuel system in accord with the present invention, a heat input to the Stirling cooler to provide the refrigeration output of the Stirling cooler is provided by a waste heat source from an internal combustion engine which employs as a combustible fuel the liquid fuel which is contained within the fuel tank. The waste heat source may be extracted from an internal combustion engine operating system including but not limited to the internal combustion engine cooling system, the internal combustion engine lubricating system and the internal combustion engine exhaust system. Similarly, within a preferred operation of a fuel tank of the present invention, the at least one of the liquid fuel and the fuel vapor within the fuel tank is cooled to a temperature of from about −30° C. to about −60° C. such that a vapor pressure of the fuel vapor with respect to the liquid fuel is significantly reduced.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENT

The present invention provides an apparatus, a system and a method for attenuating fuel vapor release when refueling a fuel tank with a liquid fuel. The present invention in general realizes the foregoing object by employing a Stirling cooling apparatus to cool at least one of a liquid fuel and a fuel vapor contained at least in part within the fuel tank, preferably to a temperature which attenuates when refueling the fuel tank release of fuel vapor.

While the present invention provides particular value when refueling a fuel tank employed for storing and dispensing a fuel employed for fueling an engine employed within a transportation vehicle, the present invention may also be employed for attenuating fuel vapor release from a fuel tank which is employed for supplying a liquid fuel within the context of other mobile engine applications, as well as immobile engine applications.

Figure 1:
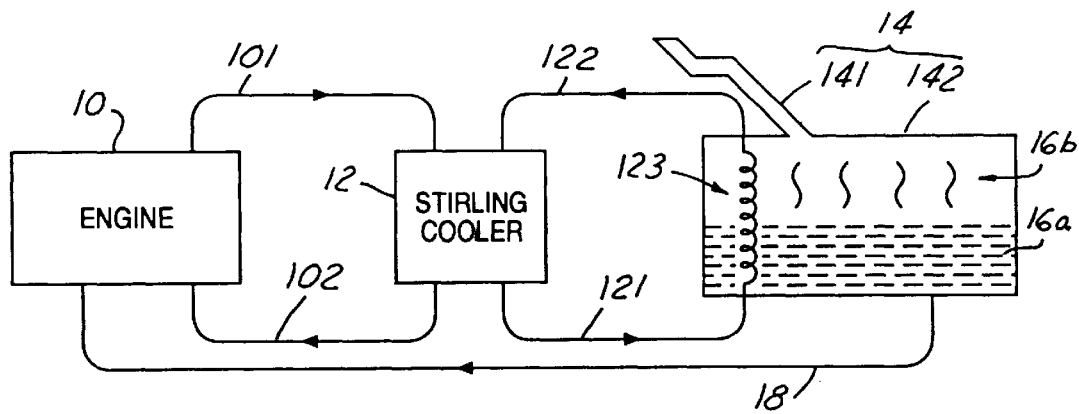
FIG. 1 shows a schematic diagram of a fuel system in accord with a first preferred embodiment of the invention.

Referring now to FIG. 1, there is shown a schematic diagram illustrating a fuel system fabricated in accord with a first preferred embodiment of the present invention.

Shown in FIG. 1 is a fuel tank 14 which comprises a fuel reservoir 142 having integral thereto a fuel filler pipe 141. Similarly, there is also illustrated within the schematic diagram of FIG. 1 a quantity of a liquid fuel 16a within the fuel reservoir 142 of the fuel tank 14, as well as a quantity of fuel vapor 16b above the liquid fuel 16a. As is illustrated within the schematic diagram of FIG. 1, the liquid fuel 16a is supplied to an engine 10 by means of a fuel supply line 18. Within the schematic diagram of FIG. 1, the liquid fuel 16a is intended as a liquid fuel which at or near typical ambient temperature will have a vapor pressure which provides the fuel vapor 16b over the liquid fuel 16a within the fuel tank 14. Similarly, the engine 10 is typically and preferably an internal combustion engine which consumes the liquid fuel 16a in a process of producing power for locomotion of a transportation vehicle which employs the engine 10.

As is also illustrated within the schematic diagram of FIG. 1, the engine 10 has: (1) a waste heat supply line 101 supplying waste heat from the engine 10 to a Stirling cooler 12; and (2) a depleted waste heat return line 102 returning from the Stirling cooler 12 to the engine 10. Within the first preferred embodiment of the invention, waste heat which is supplied to the Stirling cooler 12 through the waste heat supply line 101 may be waste heat extracted from the engine 10 operating systems including but not limited to the engine 10 cooling system, the engine 10 lubricating system and the engine 10 exhaust system. Similarly, although the first preferred embodiment of the present invention as illustrated within the schematic diagram of FIG. 1 illustrates the use of a depleted waste heat return line 102 to the engine 10, under circumstance in particular where the waste heat supply line 101 derives from the engine 10 exhaust system waste heat supply, it is typical and preferred within the first preferred embodiment of the present invention that there not be employed a depleted waste heat return to the engine 10.

With respect to the Stirling cooler 12, Stirling coolers are generally known, and available, in several arts as thermal engines which employ a heat source as a source of energy for providing a refrigeration output, typically while employing a gaseous working fluid.

Finally, there is also shown within the schematic diagram of FIG. 1: (1) a refrigerant supply line 121 emanating from the Stirling cooler 12 and leading to a first heat exchanger 123 disposed within the fuel reservoir 142 of the fuel tank 14; and (2) a depleted refrigerant return line 122 returning from the first heat exchanger 123 to the Stirling cooler 12. As is illustrated within the schematic diagram of FIG. 1, within the first preferred embodiment of the invention it is intended that the first heat exchanger 123 contact at least one of the liquid fuel 16a and the fuel vapor 16b within the fuel reservoir 142 of the fuel tank 14, such that in conjunction with the refrigeration output of the Stirling cooler 12 the first heat exchanger 123 cools the at least one of the liquid fuel 16a and the fuel vapor 16b within the fuel reservoir 142 of the fuel tank 14 to a sufficiently low temperature such that there is attenuated or eliminated the fuel vapor 16b over the liquid fuel 16a within the fuel reservoir 142 of the fuel tank 14. Such cooling is typically and preferably provides a liquid fuel 16a temperature of from about −30° C. to about −60° C., such that upon refueling the fuel tank 14 as illustrated within the schematic diagram of FIG. 1 there is minimal fuel vapor 16b to be displaced.

For an application in accord with the first preferred embodiment of the present invention which employs for a transportation vehicle a fuel tank 14 of capacity from about 10 to about 45 gallons which is insulated to attenuate a heat intrusion into the fuel tank 14, it is typical and preferred that the Stirling cooler 12 be of a fabrication which provides a refrigeration output based on the specific heat and the volume of the tank. For example and without limitation, such a Stirling cooler may be obtained from Sunpower, Inc., Athens, Ohio, USA.

Figure 2:
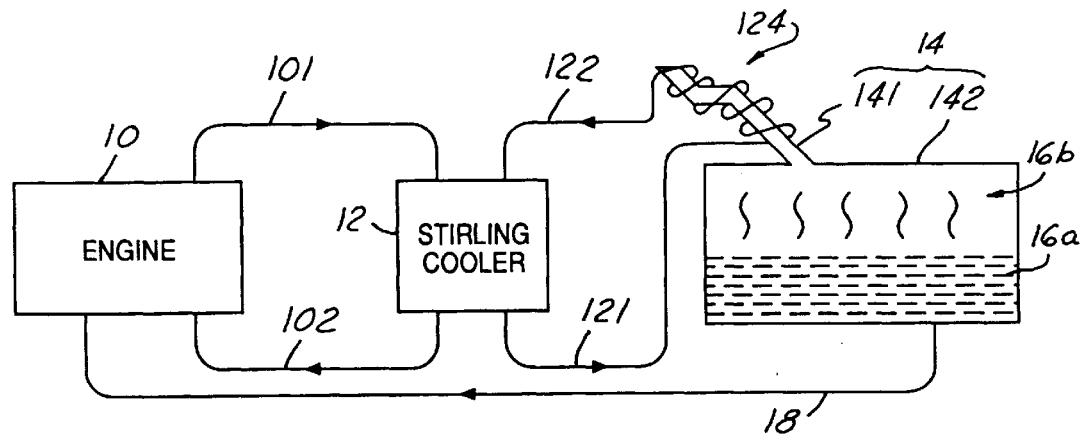
FIG. 2 shows a schematic diagram of a fuel system in accord with a second preferred embodiment of the invention.

Referring now to FIG. 2, there is shown a schematic diagram illustrating a fuel system fabricated in accord with a second preferred embodiment of the present invention.

Shown in FIG. 2 is a schematic diagram of a fuel system otherwise equivalent to the fuel system whose schematic diagram is illustrated in FIG. 1, but wherein in place of the first heat exchanger 123 disposed within the fuel reservoir 142 of the fuel tank 14 there is instead employed a second heat exchanger 124 disposed within and/or surrounding the fuel filler pipe 141 of the fuel tank 14. The sizing of all other components within the fuel system of the second preferred embodiment of the present invention remains unchanged.

Within the second preferred embodiment of the present invention, by employing the second heat exchanger 124 disposed within and/or surrounding the fuel filler pipe 141 there is intended both to cool incoming fuel introduced into the fuel tank 14 and displaced fuel vapor 16b otherwise exiting the fuel tank 14 such that there is also attenuated release of any fuel vapor 16b generated incident to introducing a quantity of liquid fuel into the fuel tank 14. Further description of a fuel filler pipe cooling configuration which may be powered by a Stirling cooler in accord with the present invention is disclosed within related co-assigned U.S. Pat. No. 5,636,668, which is incorporated herein fully by reference.

Figure 3:
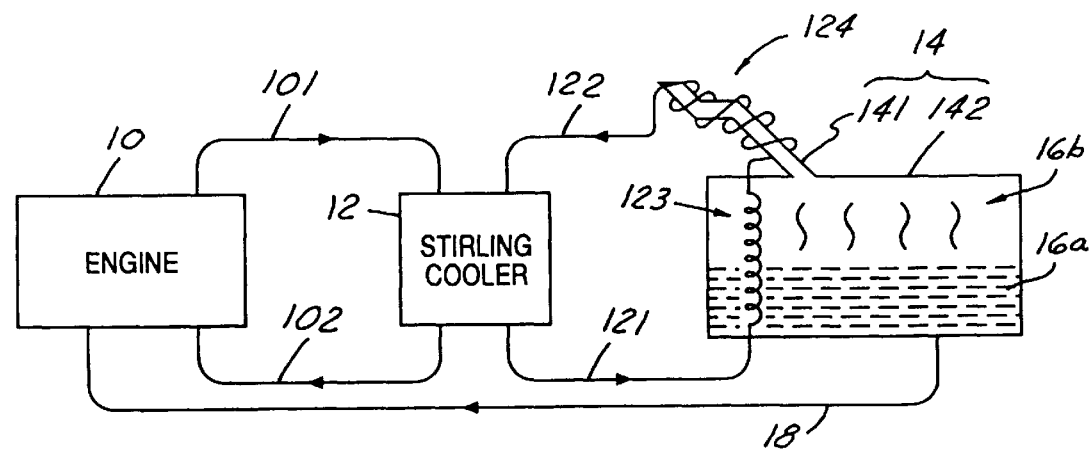
FIG. 3 shows a schematic diagram of a fuel system in accord with a third preferred embodiment of the invention.

Referring now to FIG. 3, there is shown a schematic diagram illustrating a fuel system in accord with a third preferred embodiment of the present invention.

As is illustrated within the schematic diagram of FIG. 3, the fuel system incorporates both the first heat exchanger 123 disposed within the fuel reservoir 142 of the fuel tank 14 in accord with the first preferred embodiment of the present invention as illustrated within the schematic diagram of FIG. 1 and the second heat exchanger 124 disposed within and/or surrounding the fuel filler pipe 141 of the fuel tank 14 in accord with the fuel system of the second preferred embodiment of the present invention as illustrated within the schematic diagram of FIG. 2. Thus within the fuel system in accord with the third preferred embodiment of the present invention there is cooled at least one of the liquid fuel 16a and the fuel vapor 16b both within the fuel reservoir 142 of the fuel tank 14 and the fuel filler pipe 141 of the fuel tank 14.

As is understood by a person skilled in the art, although the preferred embodiments of the present invention illustrate: (1) the first heat exchanger 123 and the second heat exchanger 124 as remote from the Stirling cooler; and (2) both the liquid fuel 16a and the fuel vapor 16b as contained within the fuel tank 14, the present invention also contemplates: (1) that an appropriate heat exchanger may be fabricated closer to or integral with a Stirling cooler; and (2) that liquid fuel or fuel vapor is transported from a fuel tank to the heat exchanger which is remote from the fuel tank. Thus, within the present invention, a liquid fuel and a fuel vapor need only be contained in part within a fuel tank.

As is similarly understood by a person skilled in the art, the preferred embodiments and examples of the present invention are illustrative of the present invention rather than limiting of the present invention. Revisions and modifications may be made to methods materials structures and dimensions through which is provided a fuel system in accord with the preferred embodiments of the present invention while still providing a fuel system in accord with the present invention, further in accord with the accompanying claims.

What is claimed is:

1. A fuel tank fabrication comprising:
   a fuel tank;
   a liquid fuel and a fuel vapor contained at least in part within the fuel tank;
   a heat exchanger in thermal communication with at least one of the liquid fuel and the fuel vapor; and a Stirling cooling apparatus in thermal communication with the heat exchanger such that the at least one of the liquid fuel and the fuel vapor is cooled by a refrigeration output of the Stirling cooling apparatus.

2. The fuel tank fabrication of claim 1 wherein the heat exchanger is positioned such that it cools the at least one of the liquid fuel and the fuel vapor as the liquid fuel is introduced into the fuel tank.

3. The fuel tank fabrication of claim 1 wherein the heat exchanger is positioned such that it cools the at least one of the liquid fuel and the fuel vapor after the liquid fuel has been introduced into the fuel tank.

4. The fuel tank fabrication of claim 1 further comprising:
a heat source having a heat output which drives the Stirling cooling apparatus, wherein:
the heat source is an engine which is fueled by the liquid fuel in the fuel tank.

5. A fuel system comprising:
a fuel tank;
a liquid fuel and a fuel vapor contained at least in part within the fuel tank;
a heat exchanger in thermal communication with at least one of the liquid fuel and the fuel vapor;
a Stirling cooling apparatus in thermal communication with the heat exchanger such that the at least one of the liquid fuel and the fuel vapor is cooled by a refrigeration output of the Stirling cooling device; and
a heat source having a heat output which drives the Stirling cooling device, where the heat source is an engine which is fueled by the liquid fuel.

6. The fuel system of claim 5 wherein the heat exchanger is positioned such that it cools the at least one of the liquid fuel and the fuel vapor as the liquid fuel is introduced into the fuel tank.

7. The fuel system of claim 5 wherein the heat exchanger is positioned such that it cools the at least one of the liquid fuel and the fuel vapor after the liquid fuel has been introduced into the fuel tank.

8. The fuel system of claim 5 wherein the heat output of the heat source which is the engine which is fueled by the liquid fuel is selected from the group consisting of engine cooling system waste heat output, engine lubricating system waste heat output and engine exhaust system waste heat output.

9. A method for fueling a vehicle comprising:
providing a vehicle having fabricated therein a fuel tank having contained at least in part therein a liquid fuel and a fuel vapor;
cooling at least one of the liquid fuel and the fuel vapor while employing a Stirling cooling apparatus such that upon refueling of the fuel tank there is attenuated a displacement of the fuel vapor from the fuel tank.

10. The method of claim 9 wherein the at least one of the liquid fuel and the fuel vapor is cooled as the liquid fuel is introduced into the fuel tank.

11. The method of claim 9 wherein the at least one of the liquid fuel and the fuel vapor is cooled after the liquid fuel is introduced into the fuel tank.

* * * * *